United States Patent
Patten

(10) Patent No.: US 10,793,780 B2
(45) Date of Patent: Oct. 6, 2020

(54) HEATING MATERIALS THROUGH CO-GENERATION OF HEAT AND ELECTRICITY

(71) Applicant: Red Leaf Resources, Inc., Salt Lake City, UT (US)

(72) Inventor: James W. Patten, Salt Lake City, UT (US)

(73) Assignee: Red Leaf Resources, Inc., Salt Lake City, UT (US)

( * ) Notice: Subject to any disclaimer, the term of this patent is extended or adjusted under 35 U.S.C. 154(b) by 0 days.

(21) Appl. No.: 16/159,376

(22) Filed: Oct. 12, 2018

(65) Prior Publication Data

US 2019/0119578 A1    Apr. 25, 2019

Related U.S. Application Data

(60) Provisional application No. 62/571,687, filed on Oct. 12, 2017.

(51) Int. Cl.
| | |
|---|---|
| *C10G 1/06* | (2006.01) |
| *C10G 1/04* | (2006.01) |
| *F01L 15/10* | (2006.01) |
| *F02C 6/04* | (2006.01) |
| *C10B 53/06* | (2006.01) |

(Continued)

(52) U.S. Cl.
CPC ............... *C10G 1/06* (2013.01); *C10B 47/06* (2013.01); *C10B 49/02* (2013.01); *C10B 53/06* (2013.01); *C10G 1/02* (2013.01); *C10G 1/04* (2013.01); *F01L 15/10* (2013.01); *F02C 6/04* (2013.01); *C10G 2300/1033* (2013.01); *C10G 2300/4037* (2013.01)

(58) Field of Classification Search
CPC .... C10G 1/02; C10G 1/04; C10G 1/06; C10B 47/06; C10B 49/02; C10B 53/06; F02C 6/04; F01D 15/10
See application file for complete search history.

(56) References Cited

U.S. PATENT DOCUMENTS

| | | |
|---|---|---|
| 2,632,297 A | 3/1953 | Ogston |
| 3,216,711 A | 11/1965 | Diotalevi et al. |

(Continued)

FOREIGN PATENT DOCUMENTS

| | | |
|---|---|---|
| GB | 958731 | 5/1964 |
| JP | 2003/254085 | 9/2003 |
| WO | WO 2017/059125 A1 | 4/2017 |

OTHER PUBLICATIONS

PCT Application No. PCT/US18/55702; Filing Date Oct. 12, 2018; James W. Patten; International Search Report, dated Dec. 13, 2018; 11 Pages.

(Continued)

*Primary Examiner* — Brian A McCaig

(57) ABSTRACT

Systems and methods for heating material through cogeneration of thermal and electrical energy can include a heat source and an electric generator configured to produce hot exhaust gas and electricity. One or more heating conduits can carry the hot exhaust gas to one or more bodies of material. The electric generator can at least partially power one or more electric heaters configured to reheat the hot exhaust gas after a portion of heat has been transferred from the hot exhaust gas to the one or more bodies of material.

34 Claims, 6 Drawing Sheets

(51) Int. Cl.
    *C10G 1/02*     (2006.01)
    *C10B 49/02*     (2006.01)
    *C10B 47/06*     (2006.01)

(56) References Cited

U.S. PATENT DOCUMENTS

| | | |
|---|---|---|
| 3,216,712 A | 11/1965 | Dunkak |
| 3,424,695 A | 1/1969 | Wiesenthal |
| 3,765,167 A | 10/1973 | Rudolph et al. |
| 3,778,047 A | 12/1973 | Stevens |
| 4,275,562 A | 6/1981 | Fejer |
| 4,912,282 A | 3/1990 | Klaus |
| 5,247,907 A | 9/1993 | Lee et al. |
| 6,144,688 A | 11/2000 | Thienpont |
| 7,288,690 B2 | 10/2007 | Bellet et al. |
| 2007/0095536 A1 | 5/2007 | Vinegar et al. |
| 2010/0218912 A1* | 9/2010 | Lawless ............... C09K 8/467 165/45 |
| 2010/0232881 A1* | 9/2010 | Carter, Jr. ............ E02D 19/16 405/55 |
| 2011/0266726 A1 | 11/2011 | Depuy et al. |
| 2017/0121255 A1 | 5/2017 | Iaccino |

OTHER PUBLICATIONS

U.S Department of Energy.; "Improve Overall Plant Efficiency and Fuel Use. Combined Heat and Power (CHP) Tool Identifies Energy Savings in Gas Turbine-Driven CHP Systems." Software Tools for Industry; Industrial Technologies Program; 2 Pages.

\* cited by examiner

HEATING MATERIALS THROUGH CO-GENERATION OF HEAT AND ELECTRICITY

RELATED APPLICATION(S)

This application claims priority to U.S. Provisional Application No. 62/571,687, filed Oct. 12, 2017 and which is incorporated herein by reference.

FIELD OF THE INVENTION

The present invention relates to systems and methods for heating materials using co-generation of heat and electricity. Specifically, the invention relates to heating materials using hot gases and supplemental heating using electric heaters. Therefore, the invention relates to the field of heat transfer and process control.

BACKGROUND

Processes for producing hydrocarbon products from hydrocarbonaceous materials such as oil shale and tar sands often require heating the materials to convert their hydrocarbon content into recoverable liquid or gaseous products. Historically, the dominant research and commercial processes have included above-ground retorts and in-situ processes. In each type of process, hydrocarbonaceous materials are heated to a sufficient temperature to liberate hydrocarbon products. For example, oil shale is heated to break down kerogen in the oil shale through the process of pyrolysis, yielding liquid and vapor hydrocarbon compounds along with other products such as water vapor and residuals.

Heating has been achieved by steam injection, partial combustion of the hydrocarbonaceous material, roasting in above-ground retorts, microwave radiation, underground heat transfer pipes, and other various methods. Each of the various methods faces challenges related to energy efficiency, water usage, environmental safety, and many other factors. When fossil fuels or a portion of the hydrocarbonaceous materials are burned to provide heat, the overall efficiency of the process is reduced and the carbon footprint of the process is increased. Therefore, research continues into more efficient methods of heating hydrocarbonaceous materials to extract hydrocarbon products.

SUMMARY

The present disclosure describes systems and methods for heating material through cogeneration of thermal and electrical energy. A system for heating material through cogeneration of thermal and electrical energy can include a heat source and an electric generator, where the heat source produces hot exhaust gas. One or more heating conduits can be associated with the heat source. The heating conduits can carry the hot exhaust gas from the heat source to one or more bodies of material. The electric generator can power one or more electric heaters that reheat the exhaust gas. The electric heaters can be associated with the heating conduits, and the electric heaters can be configured to reheat the exhaust gas after a portion of the heat from the exhaust gas has been transferred to the bodies of material. For example, the temperature of the exhaust gas can start at an initial temperature and then decrease due to heat transfer to the material as the exhaust gas flows through the heating conduits. The electric heaters can heat the exhaust gas back up to the initial temperature. The exhaust gas can then continue to flow through the heating conduits and transfer additional heat to the bodies of material.

A method of heating material through cogeneration of thermal and electrical energy can involve producing hot exhaust gas from at least one heat source. An associated electric generator can also be used to produce electricity. The hot exhaust gas can be carried through one or more heating conduits to one or more bodies of material. A portion of the heat in the hot exhaust gas can be transferred to the one or more bodies of material, thereby heating the bodies of material to an elevated target temperature. After this heat transfer, the exhaust gas can be reheated with an electric heater. The electric heater can be at least partially powered by the electric generator.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
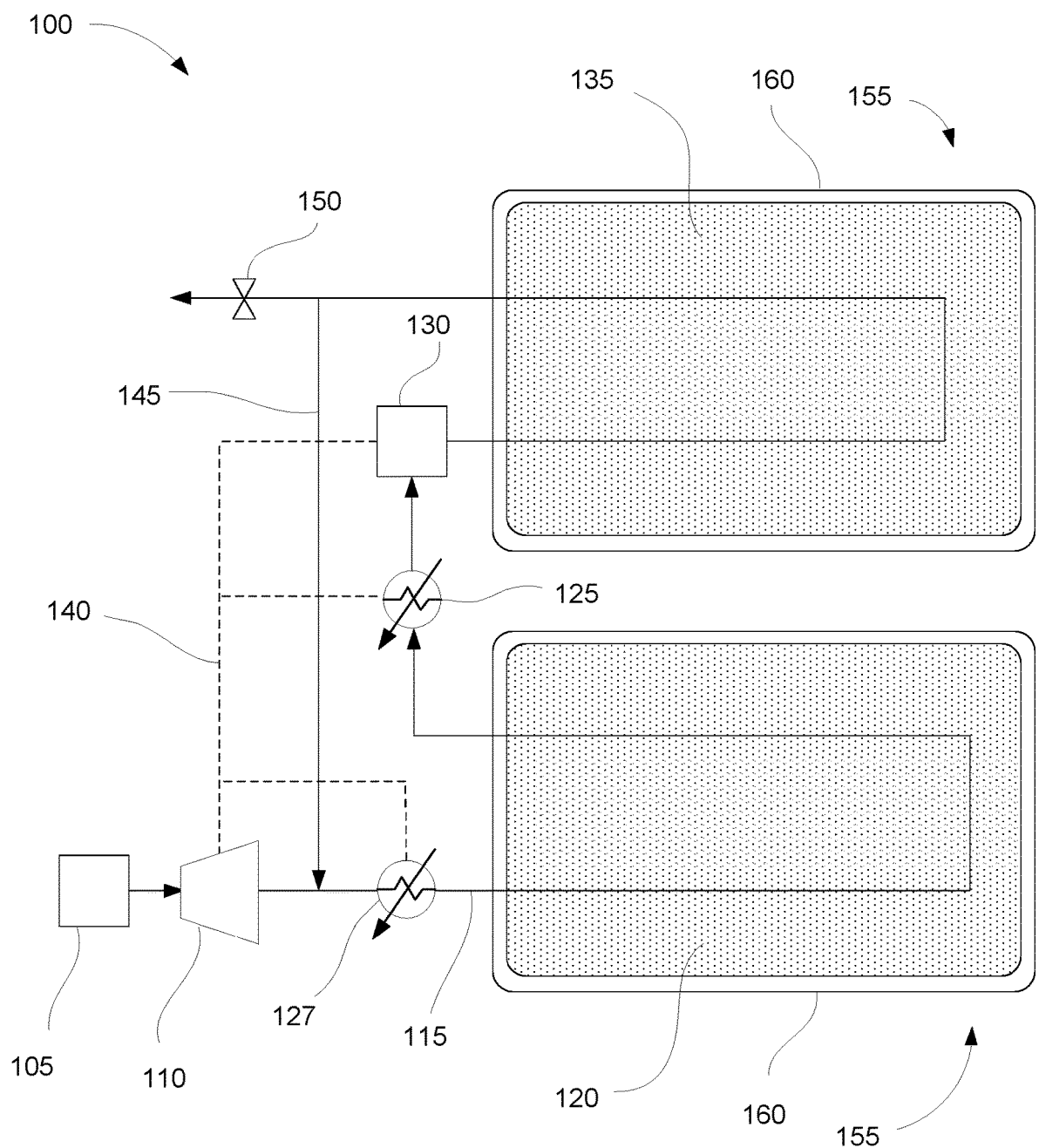
FIG. 1 is a schematic illustration of a system for heating material through cogeneration of thermal and electrical energy, in accordance with an embodiment of the present invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

As used herein, "hydrocarbonaceous material" refers to any hydrocarbon-containing material from which hydrocarbon products can be extracted or derived. For example, hydrocarbons may be extracted directly as a liquid, removed via solvent extraction, directly vaporized by conversion from a feedstock material, or otherwise removed from the material. Many hydrocarbonaceous materials contain kerogen or bitumen which is converted to a flowable or recoverable hydrocarbon through heating and pyrolysis. Hydrocarbonaceous materials can include, but are not limited to, oil shale, tar sands, coal, lignite, bitumen, peat, and other organic rich rock. Thus, existing hydrocarbon-containing materials can be upgraded and/or released from such feedstock through a chemical conversion into more useful hydrocarbon products.

As used herein, "spent hydrocarbonaceous material" and "spent oil shale" refer to materials that have already been used to produce hydrocarbons. Typically after producing hydrocarbons from a hydrocarbonaceous material, the remaining material is mostly mineral with the organic content largely removed (e.g. often less than 5%, in some cases less than 1% organic content by weight, and in other cases substantially no organic content).

As used herein, "rich hydrocarbonaceous material" and "rich oil shale" refer to materials that have relatively high hydrocarbon content. As an example, rich oil shale can typically have from 12% to 25% hydrocarbon content by weight, and some cases higher.

As used herein, "compacted earthen material" refers to particulate materials such as soil, sand, gravel, crushed rock, clay, spent shale, mixtures of these materials, and similar materials. A compacted earthen material suitable for use in the present invention typically has a particle size of less than about 10 cm in diameter.

As used herein, whenever any property is referred to that can have a distribution between differing values, such as a temperature distribution, particle size distribution, etc., the property being referred to represents an average of the distribution unless otherwise specified. Therefore, "particle size" refers to a number-average particle size, and "temperature of the body of crushed hydrocarbonaceous material" refers to an average temperature of the body of heated material.

It is noted that, as used in this specification and in the appended claims, the singular forms "a," "an," and "the" include plural referents unless the context clearly dictates otherwise. Thus, for example, reference to "a layer" includes one or more of such features, reference to "a particle" includes reference to one or more of such elements, and reference to "producing" includes reference to one or more of such steps.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context. However, unless otherwise enunciated, the term "about" generally connotes flexibility of less than 1%, and most often less than 0.1%, and in some cases less than 0.01%.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. "Substantially" refers to a degree of deviation that is sufficiently small so as to not measurably detract from the identified property or circumstance. The exact degree of deviation allowable may in some cases depend on the specific context. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context. Additionally, adjacent structures or elements can in some cases be separated by additional structures or elements between the adjacent structures or elements.

As used herein, the term "at least one of" is intended to be synonymous with "one or more of." For example, "at least one of A, B and C" explicitly includes only A, only B, only C, and combinations of each.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the following figures should not be considered limiting.

Heating Materials through Cogeneration of Thermal and Electric Energy

Many processes for extracting hydrocarbon products from hydrocarbonaceous materials involve heating large quantities of hydrocarbonaceous materials, often for extended periods of time. For example, many in situ processes for extracting oil from oil shale can involve great energy expenditure to heat oil shale in the earth. Recently, new processes have been developed for extracting hydrocarbons from crushed oil shale inside an impermeable impoundment. In these methods, oil shale can be mined, crushed, and placed in an impoundment that includes impermeable walls, floor, and/or ceiling to prevent unwanted mass transfer of materials into and out of the impoundment. The impoundment can often include heating conduits buried in the crushed oil shale to heat the oil shale. A heat transfer fluid can be passed through the heating conduits to provide heat to the body of oil shale in the impoundment.

Oil shale contains kerogen, which can break down at high temperatures into smaller hydrocarbons. The body of crushed oil shale in the impoundment can be heat to an elevated temperature for a period of time sufficient to break down the kerogen in the oil shale and liberate hydrocarbon products. For example, the oil shale is often heated to a production temperature from about 200° C. to about 500° C. for a period of days, weeks, months, or even a year or more. The impoundments can be quite large, often having depths of about 10 meters to about 50 meters and covering areas of multiple acres. Thus, a large amount of energy can be expended to heat these large bodies of crushed oil shale for the extended time periods involved.

The present invention provides systems and methods for heating bodies of material. In the context of oil shale production, these systems and methods can improve the energy efficiency of oil shale production by reducing the total amount of energy expended to heat the oil shale. These systems and methods can also simplify infrastructure used to heat the oil shale, such as heat sources, heating conduits, pumps, and so on. Thus, the systems and methods of the present invention can reduce construction costs when constructing impoundments for processing oil shale. Besides processes involving impoundments filled with crushed oil shale as described above, the systems and methods of the present invention can also be applied to other processes for extracting hydrocarbons from oil shale or other hydrocarbonaceous materials such as tar sands, coal, bitumen, peat, biomass, and so on. Additionally, the systems and methods of the present invention can be applied to any process that involves heating bodies of material in which energy saving is desired.

With the above description in mind, some embodiments of the present invention can include systems for heating material through cogeneration of thermal and electrical energy. Generally, these systems can include a heat source, an electric generator, and an electric heater. The heat source is configured to produce a hot exhaust gas, where one or more heating conduits configured to carry the hot exhaust gas from the heat source to one or more bodies of material. The electric heaters can be at least partially powered by the electric generator. After the hot exhaust gas has traveled through a portion of the heating conduits and transferred an amount of heat to the one or more bodies of material, the electric heater can reheat the hot exhaust gas back to a higher temperature. In some cases, the hot exhaust gas can then continue to travel through heating conduits and transfer additional heat to the bodies of material.

The systems according to present invention are scalable, and can be as simple as a system with a single body of material, or as complex as many separate bodies of material connected in a large cogeneration heating system. Thus, systems can include a single heat source, a single electric generator, a single heating conduit, and a single electric heater. Alternatively, systems can include multiples of any of the components described herein.

FIG. 1 is a schematic illustration of one exemplary system 100 according to the present invention. A heat source 105 can produce a hot exhaust gas from a fuel. The exhaust gas can be used in an electric generator 110 which converts some of the energy of the hot exhaust gas into electricity. After being used by the generator, the hot exhaust gas can still retain a significant amount of thermal energy. The hot exhaust gas is passed through heating conduits 115 that are embedded in a first body of crushed hydrocarbonaceous material 120. The heating conduit is associated with an electric heater 125. The electric heater can reheat the exhaust gas after a portion of the heat from the exhaust gas has been transferred to the first body of crushed hydrocarbonaceous material. The exhaust gas then proceeds through a blower 130, which pushes the exhaust gas through heating conduits embedded in a second body of crushed hydrocarbonaceous material 135. The electric heater and the blower are both powered by the electric generator through electric line 140. After the exhaust gas passes through the second body of crushed hydrocarbonaceous material, the exhaust gas can be either recycled through a recycle line 145 to be passed through the heating conduits again, or vented through a venting valve 150. In some cases, the cooler exhaust gas in the recycle line can dilute the hot exhaust gas from the heat source and electric generator to reduce the temperature of the exhaust gas flowing through the heating conduits embedded in the bodies of material. The flow rate of recycled exhaust gas can be controlled to maintain a target temperature of the exhaust gas flowing through the heating conduits. In the embodiment shown in the figure, the bodies of crushed hydrocarbonaceous material are within impoundments 155, which include an impermeable barrier layer 160 encapsulating the crushed hydrocarbonaceous material.

In some embodiments of the present invention, the heat source can burn a hydrocarbon fuel. In one example, the fuel can include gaseous or vapor hydrocarbons produced from hydrocarbonaceous material being processed in the system. In such examples, gaseous and vapor hydrocarbon products can be extracted from the hydrocarbonaceous material and a portion of the hydrocarbon products can be directed to a suitable combustor as the heat source. This consumes a portion of the hydrocarbon products extracted by the system, but this can be a more convenient and energy efficient fuel source compared to other fuels. In further examples, the system can be configured to burn substantially all of the gaseous hydrocarbon products. In other examples, the heat source can be fueled by hydrocarbon products that were previously extracted from a different body of hydrocarbonaceous materials, or by any other suitable fuel such as natural gas, gasoline, diesel, oil, coal, biomass, and so on.

In some cases, the heat source and electric generator can be a single integrated unit which produces both heat and electricity. For example, the heat source and electric generator can be an integrated unit which includes a gas turbine or a fuel cell. In the case of a gas turbine, a combustion zone burns incoming fuel to produce the hot exhaust gas. The hot exhaust gas is directed through the turbine to produce mechanical motion of the turbine which is converted to electricity by a mechanically associated electric generator which converts rotational motion of the turbine into electricity. Although some heat is extracted during this process, the hot exhaust gas retains sufficient heat to be used as described herein. Generally, the electric generator can be any type of electric generator that can convert thermal energy in the hot exhaust gas into electrical energy. Examples of electric generators include conventional electric generators, thermoelectric generators, and others. In one example, the electric generator can be mechanically coupled to a gas turbine. Typically, gas turbines are designed with high efficiency as a goal. That is, it is usually desired for turbines to convert as much heat energy into mechanical motion and thus electric energy as possible, resulting in a cooler exhaust stream after generating the electricity. However, because the systems of the present invention use thermal energy in the hot exhaust gas to heat bodies of material, less efficient turbines can be used. In certain examples, turbines with efficiencies from about 20% to about 55% can be used. In further examples, turbines with efficiencies from about 25% to about 35% can be used. As used herein, "efficiency" when referring to turbines and electric generators refers to a ratio of the electrical energy produced by the electric generator to the thermal energy produced by burning the fuel.

In another example, the heat source and electric generator can collectively be a fuel cell. The fuel cell can use a hydrogen source gas (e.g. pure hydrogen, hydrogen mixture, or hydrogen-containing compounds) as a fuel which is converted to electricity through an exothermic reaction to produce the hot exhaust gas. Thus, no mechanical motion or combustion zone is typically involved. Rather, electricity and heated exhaust gas are produced directly as a result of chemical reactions. In this case, the fuel cell itself acts as both the heat source and the electric generator. Non-limiting examples of fuel cells can include proton exchange membrane fuel cells, solid oxide fuel cells, phosphoric acid fuel cells, molten carbonate fuel cells, and the like. In one case, the fuel cell can be a solid oxide fuel cell.

Regardless of the specific heat source and electric generator, the hot exhaust gas can generally be from 500° F. to 1450° F., and in some case 800° F. to 900° F. depending on the particular units, applied operating conditions, and load.

In certain examples, the electric generator can include a gas turbine with an efficiency from about 20% to about 40%. In a particular example, the gas turbine can be an industrialized aircraft engine. Industrialized aircraft engines are turbines designed for use in aircraft, but repurposed for use as a power generation turbine. These turbines can often be less efficient than gas turbines purpose-built for industrial use, but industrialized aircraft engines can often be obtained at a lower cost compared to more efficient gas turbines, while also producing a hot exhaust gas at relatively higher temperatures compared to purpose built gas turbines.

Alternatively, the system can include multiple modules which collectively produce both heat and electricity for use as described herein. For example, the heat source and electric generator can include a boiler with a turbine (e.g. combined cycle gas turbine) and separate electric generator, diesel generator, or the like. Thus, a burner or other combustion chamber can result in the hot exhaust gas from which energy can be extracted to produce electricity.

Referring again to FIG. 1, the hot exhaust gas from the heat source 105 can pass through the electric generator 110 and then into a heating conduit 115. In one optional aspect, an exhaust temperature of the hot exhaust gas can be further elevated by supplemental heating by an electric heater 127. In this manner, the exhaust temperature can be adjusted to optimize performance of heat exchange within the first 120 and second 135 body of hydrocarbonaceous material. For example, a turbine or fuel cell exhaust temperature of 500° F. could be increased to 800 to 900° F. using the electric heater 127. Typically, the electric heater 127 can be oriented along the heating conduit 115 prior to entry into the first body 120. However, the electric heater may optionally be placed adjacent to or within the first body 120 of hydrocarbonaceous material. Further, the electric heater 127 can be driven using electricity from the electric generator 110.

Generally, heating conduits according to the present invention are used to carry the hot exhaust gas from the heat source to the body or bodies of material to be heated. In some embodiments, the heating conduits can be embedded in the bodies of material. The heating conduits shown in FIG. 1 are closed loop heating conduits, meaning that the hot exhaust gas is contained inside the heating conduits without any mass transfer of the exhaust gas into the bodies of material themselves. In this embodiment, the bodies of material are heated by conduction of heat through the walls of the heating conduits. However, in other embodiments, the heat conduits can be open loop heating conduits, which inject some or all of the hot exhaust into the bodies of material. In these embodiments, the bodies of material can be heated directly by the hot exhaust gas coming into direct contact with the material. Compared to closed loop heating, open loop heating can theoretically provide an infinite heat transfer area, so a smaller number of heating conduits and smaller diameter conduits can be used.

Figure 2:
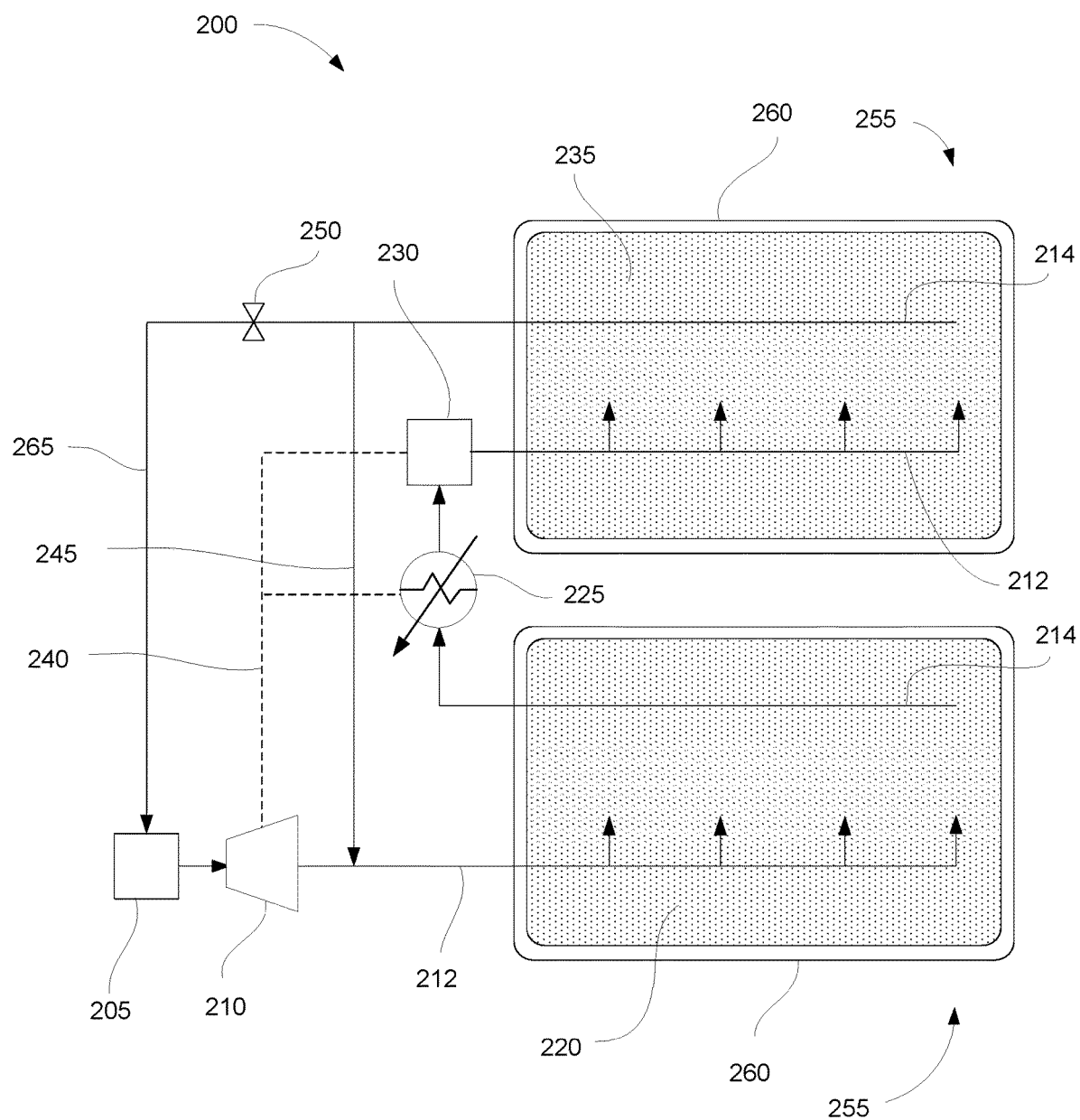
FIG. 2 is a schematic illustration of another system for heating material through cogeneration of thermal and electrical energy, in accordance with an embodiment of the present invention.

FIG. 2 shows another example of a system 200 for heating material through cogeneration of thermal and electrical energy. Similar to the system shown in FIG. 1, this system includes a heat source 205 and an electric generator 210. The heating conduits of the system include injection conduits 212 and collection conduits 214. The hot exhaust gas is injected into the first body of crushed hydrocarbonaceous material 220 through perforations in the injection conduit. This allows the hot exhaust gas to flow through spaces between particles of the crushed hydrocarbonaceous material, heating the crushed hydrocarbonaceous material. The exhaust gas then flows out of the body of crushed hydrocarbonaceous material through the collection conduit. An electric heater 225 powered by electric line 240 reheats the exhaust gas, and a blower 230 directs the exhaust gas into the second body of material 235 through an injection conduit. The exhaust gas is again collected by a collection conduit. At this point, hydrocarbon products can also be present in the exhaust gas stream. The embodiment shown in FIG. 2 includes a fuel recycle valve 250 that allows the mixture of exhaust gas and hydrocarbons to flow to the generator through a fuel recycle line 265, where the hydrocarbons can be used as fuel. Another recycle line 245 can also be used to dilute the hot exhaust gas from the electric generator 210. Thus, an outlet temperature of the hot exhaust gas can be adjusted by dilution with a cooler gas or heated using electrical resistive heaters as previously discussed. In various embodiments, the system can also include equipment for separating the hydrocarbon product from the exhaust gas, storage for hydrocarbon products, and so on. In certain embodiments, the system can be operated such that substantially all gaseous hydrocarbon products are burned as fuel in the heat source 205. In these embodiments, the main product of the process can include liquid hydrocarbons collected from the hydrocarbonaceous materials.

In the system shown in FIG. 2 and in similar systems using direct heating by injection of the exhaust gas, the heating conduits can be configured to provide uniform injection throughout the zone being heated. In some examples, this can be accomplished by using heating conduits with relatively small perforations for injection of the hot exhaust gas. The size of the perforations can be controlled so that exhaust gas is injected out of each perforation at roughly the same mass flow rate. In one example, the total area of the perforations can be significantly less than the cross-sectional area of the conduit. In some cases, the total area of all perforations in a conduit can be less than the cross-sectional area of the conduit. In a specific example, the total area of all perforations in a conduit can be less than 60% of the cross sectional area of the conduit, and in other cases from about 30% to 60%. In another specific example, the flow rate from each perforation along the entire length of the body of crushed hydrocarbonaceous material can be within 10% of the mean flow rate from the perforations.

In further examples, the heating conduits can have a diameter from about 10" to about 40". In more specific examples, the heating conduits can have a diameter from about 12" to about 36". In still further examples, the heating conduits can have a diameter from about 12" to about 20". The perforations can also vary in size. In some examples, the perforations can be from about 4 mm to about 10 mm in diameter. Collection conduits can vary in diameter from about 10" to about 40". In some cases, the collection conduits can include larger perforations compared to the heating conduits. In some examples, the collection conduits can have perforations from about 1" to about 3" in diameter. In one specific example, the collection conduits can have perforations about 2.6" in diameter.

In further examples, the perforations can be located on a lower surface of the conduit. Placing the perforations on the lower surface instead of the upper surface can help prevent clogging of the perforations with dust or small particles of hydrocarbonaceous material. Collection conduits can also have perforations on a lower surface to reduce entry of particulate material into the product stream.

In still further examples, a combination of closed loop and open loop heating conduits can be used. For example, a continuous heating conduit can be embedded in the body of crushed hydrocarbonaceous material so that the hot exhaust can flow through the entire heating conduit in a closed loop. However, the heating conduit can also have perforations so that a portion of the hot exhaust flows through the perforations and into direct contact with the crushed hydrocarbonaceous material. In some examples, a majority of the hot exhaust gas can flow through the heating conduit and a smaller portion can flow through the perforations and into the body of crushed hydrocarbonaceous material.

FIG. 2 also shows that the first and second bodies of crushed hydrocarbonaceous material 220, 235 are contained in impoundments 255 having impermeable barrier layers 260. In some embodiments of the present invention, one or more bodies of crushed hydrocarbonaceous material can be heated in one or more such impoundments. The impoundments can be similar to the impoundments described in U.S. Pat. No. 7,862,705, which is incorporated herein by reference.

In some examples, the body of crushed hydrocarbonaceous material can be formed from a material such as mined oil shale, tar sands, lignite, bitumen, coal, peat, harvested biomass, or another hydrocarbon-rich material. The crushed hydrocarbonaceous material can be contained by an impoundment that forms an impermeable barrier encapsulating the body of the crushed hydrocarbonaceous material. In some cases, the size of the impoundment can be relatively large. Larger impoundments or systems with multiple impoundments can readily produce hydrocarbon products and performance comparable to or exceeding smaller impoundments. As an illustration, single impoundments can range in size from 15 meters across to 200 meters, and often from about 100 to 160 meters across. Optimal impoundment sizes may vary depending on the hydrocarbonaceous material and operating parameters, however suitable impoundment areas can often range from about one-half to ten acres in top plan surface area. Additionally, the impoundment can have a depth from about 10 m to about 50 m.

The impoundment can include an impermeable barrier layer to prevent escape of produced hydrocarbons and heating fluids from the impoundment, while also preventing entrance of air or other unwanted fluids from the environment. As used herein, "impermeable" refers to the ability of the barrier layer to block flow of gases, vapors, and liquids through the barrier layer, at least during a time period during which the impoundment is operational and producing hydrocarbon products. In some cases, the barrier layer can be formed of particulate materials such as hydrated swelling clays, which may allow diffusion of atoms or molecules through the barrier at very low rates. However, the barrier layer can prevent any unrestricted flow across the barrier, and in many cases the barrier can be designed to prevent substantially any escape of materials during the operational lifetime of the impoundment.

Generally, the impoundment can include a floor portion, a ceiling portion, and a sidewall portion connecting the floor and the ceiling to form an enclosed volume which contains the crushed hydrocarbonaceous materials and which restricts flow of fluid outside the impoundment. The ceiling portion defines an upper portion of the enclosed volume and is contiguous with the sidewall. The floor is also contiguous with the sidewall and can be substantially horizontal or sloped toward a drain as desired for the collection of hydrocarbon fluids extracted during processing of the hydrocarbonaceous materials.

In some embodiments, the impoundment can be formed along walls of an excavated hydrocarbonaceous material deposit. For example, oil shale, tar sands, or coal can be mined from a deposit to form a cavity that corresponds approximately to a desired encapsulation volume for the impoundment. The excavated cavity can then be used as a support for the floor and walls of the impoundment. In an alternative embodiment, a berm can be formed around the outside wall surface of the impoundment if the impoundment is partially or substantially above ground level. An impoundment can be a pant of an above-ground, free-standing construction with berms supporting the side walls and the floor of the impoundment being supported by the ground beneath the impoundment.

The impoundment can be substantially free of undisturbed geological formations. Specifically, the impoundment can be completely constructed and manmade as a separate isolation mechanism for containing the body of crushed hydrocarbonaceous material and preventing uncontrolled migration of fluids into or out of the body of crushed hydrocarbonaceous material. Undisturbed geological formations can have cracks and pores that can make the formations permeable to liquids and gases. Forming the impoundment as a completely manmade structure, without using undisturbed geological formations as the floor or walls, can reduce the risk of any liquids or gases seeping through the geological formations. However, in some embodiments the impoundment can employ some elements of the surface of an excavated geological formation. For example, in some formations, the floor and walls of the excavation might have sufficiently low natural permeability that an additional barrier layer may not be necessary for portions of the impoundment.

The impoundment can generally include a floor, a sidewall extending upwardly from the floor and a ceiling extending over the sidewall to define an enclosed volume. Each of the floor, sidewall and ceiling can be made up of a multiplicity of layers including an inner layer of fines or other insulation material and an outer layer of a swelling clay amended soil or similar fluid impermeable barrier material. Optionally, an outer membrane that further prevents passage of fluids outside the impoundment can be employed as a fluid barrier in addition to the swelling clay amended soil. The outer membrane can serve as a secondary back-up seal layer should the primary seal layer fail for any reason. An inner layer of high temperature asphalt or other fluid barrier material may also be optionally applied to the inner surface of the fines layer and define the inner surface of the impoundment.

Swelling clays are inorganic materials that can be hydrated, causing the clay to swell or otherwise create a barrier to fluid flow. The impoundment can include a barrier layer formed with particles of dry clay and other earthen materials, and then the clay can be hydrated to cause the clay particles to swell and create a barrier. Typically such a barrier layer can be formed of a solid phase of particles and a liquid phase of water which collectively form a substantially continuous fluid barrier. For example, the floor, walls, and ceiling of the barrier layer can be formed using a swelling clay amended soil. When the swelling clay is hydrated, it swells and fills up the void spaces between particles of other materials in the soil. In this way the swelling clay amended soil becomes less permeable to fluids. With a sufficient mixture of swelling clays and other earthen materials, the barrier layer can be substantially impermeable to fluid flow. Some examples of suitable swelling clays include bentonite clay, montmorillonite, kaolinite, illite, chlorite, vermiculite, argillite, smectite, and others.

The combined multilayers forming the impoundment can also serve to insulate the body of hydrocarbonaceous material so that heat within the enclosed volume is retained to facilitate the removal of hydrocarbons from the hydrocarbonaceous material. In some examples, the impoundment can include a layer of fines, such as gravel or crushed spent oil shale, to insulate the impoundment. This fines layer can have a temperature gradient across the layer sufficient to allow the swelling clay amended soil layer to be cool enough to remain hydrated. The material forming the fines layer can be a particulate material of less than about 3 cm in diameter.

The impoundment can be formed using any suitable approach. However, in one aspect, the impoundment is formed from the floor up. The formation of the wall or walls and forming the body of crushed hydrocarbonaceous material within the walls can be accomplished simultaneously in a vertical deposition process where materials are deposited in a predetermined pattern. For example, multiple chutes or other particulate delivery mechanisms can be oriented along corresponding locations above the deposited material. By selectively controlling the volume of particulate delivered and the location along the aerial view of the system where each respective particulate material is delivered, the layers and structure can be formed simultaneously from the floor to the ceiling. The sidewall portions of the impoundment can be formed as a continuous upward extension at the outer perimeter of the floor and each layer present, including the swelling clay amended soil layer, fines layer, and, if present membrane and/or asphalt liner, are constructed as a continuous extension of the floor counterparts. During the building up of the sidewall, the crushed hydrocarbonaceous material can be simultaneously placed on the floor and within the sidewall perimeter such that the volume that will become the enclosed space is being filled simultaneously with the rising of the constructed sidewall. In this manner, internal retaining walls or other lateral restraining considerations can be avoided. This approach can also be monitored during vertical build-up in order to verify that intermixing at interfaces of layers is within acceptable predetermined tolerances (e.g. to maintain functionality of the respective layer). For example, excessive intermingling of swelling clay amended soil with fines may compromise the sealing function of the swelling clay amended soil laver. This can be avoided by careful deposition of each adjacent layer as it is built up and/or by increasing deposited layer thickness.

As the build-up process nears the upper portions, the ceiling can be formed using the same delivery mechanisms described above and merely adjusting the location and rate of deposition of the appropriate material forming the ceiling layer. For example, when the desired height of the sidewall is reached, a sufficient amount of the impoundment materials can be added to form a ceiling.

Alternatively, multiple smaller vessels can be used to hold and process the one or more bodies of material. In one example, vertical steel vessels can be used which include top loading inlets and bottom unloading outlets. In these examples, the vessels can range in size from about 4 feet to about 20 feet in diameter and about 5 feet to about 50 feet in height, although other dimensions can be used depending on materials, capital costs, and other factors. Vessels can optionally be lined with refractory lining.

As shown in FIGS. 1 and 2, in some embodiments the system can include multiple impoundments with electric heaters positioned to reheat the exhaust gas between the impoundments. Blowers can also be placed between the impoundments to keep the exhaust gas moving through the heating conduits. In some cases, long heat conduits can have a significant pressure drop, and the blowers can provide an increase in pressure to push the exhaust gas through additional heating conduits. The systems shown in FIGS. 1 and 2 can potentially be expanded to include any number of impoundments with electric heaters and blowers positioned between the impoundments.

Figure 3:
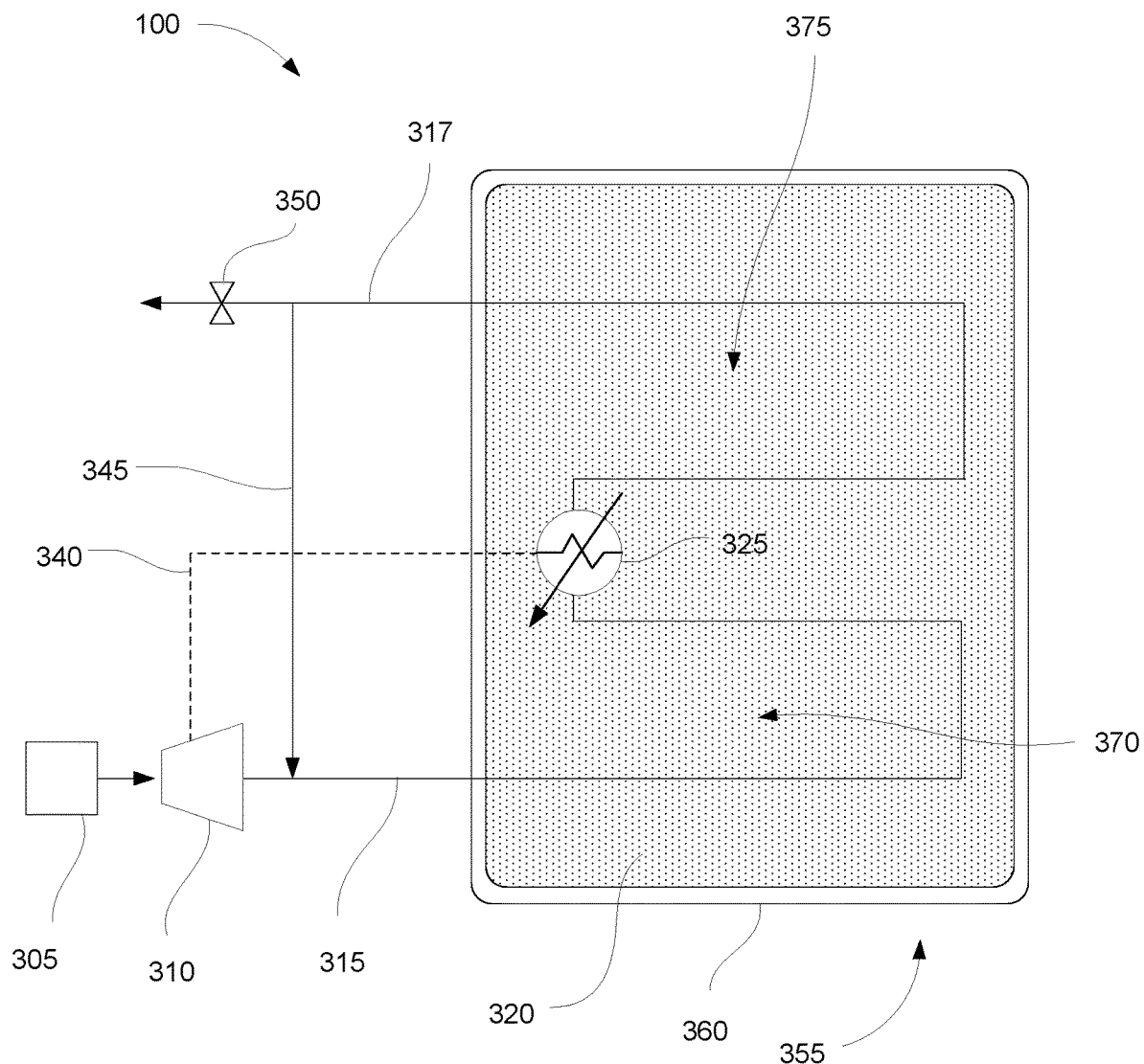
FIG. 3 is a schematic illustration of yet another system for heating material through cogeneration of thermal and electrical energy, in accordance with an embodiment of the present invention.

In further embodiments, one or more electric heaters can be positioned within an impoundment to reheat the exhaust gas inside the impoundment. FIG. 3 shows a system 300 that includes a heat source 305 and an electric generator 310, a first heating conduit 315 leading to a body of crushed hydrocarbonaceous material 320 inside an impoundment 355 with an impermeable barrier layer 360, and an electric heater 325 placed inside the impoundment. The electric heater is powered by the electric generator through electric line 340. The exhaust gas passes by the electric heater and through a second heating conduit 317. As shown in the figure, the first heating conduit heats a first region 370 of the body of crushed hydrocarbonaceous material, and the second heating conduit heats a second region 375 of the body of crushed hydrocarbonaceous material. After the exhaust gas passes through the heating conduits, the exhaust gas can be vented through venting valve 350 or recycled through recycle line 345.

The electric heater within the impoundment can reheat the exhaust gas before the exhaust gas has passed all the way through the impoundment. This can improve the temperature uniformity in the impoundment. As heat is transferred from the exhaust gas to the body of material, the temperature of the exhaust gas decreases. This decrease in temperature tends to result in uneven heating of the body of crushed hydrocarbonaceous material. In some examples, even heating can be helpful to produce as much hydrocarbon product as possible in an efficient way from the crushed hydrocarbonaceous material. Therefore, placing electric heaters in one or more locations along the length of the heating conduit, even inside an impoundment, can improve the process. The spacing of electric heaters can be selected so that the exhaust gas is maintained close to a target temperature. For example, the exhaust gas temperature can be maintained within a certain target temperature range. In one particular example, the exhaust gas can be maintained within the range of about 350° C. to about 550° C. Therefore, each of the electric heaters can be configured to reheat the gas to a temperature within the range of about 400° C. to about 550° C. In additional examples, the spacing between the electric heaters can be from about 100 m to about 500 m. In addition to improving temperature uniformity, placing electric heaters along the heating conduits within an impoundment can allow longer straight runs of heating conduit pipe to be placed. This can reduce the number of bends in the heating conduit, which reduces the pressure drop and the energy required for pumping the exhaust gas through the heating conduits.

Figure 4:
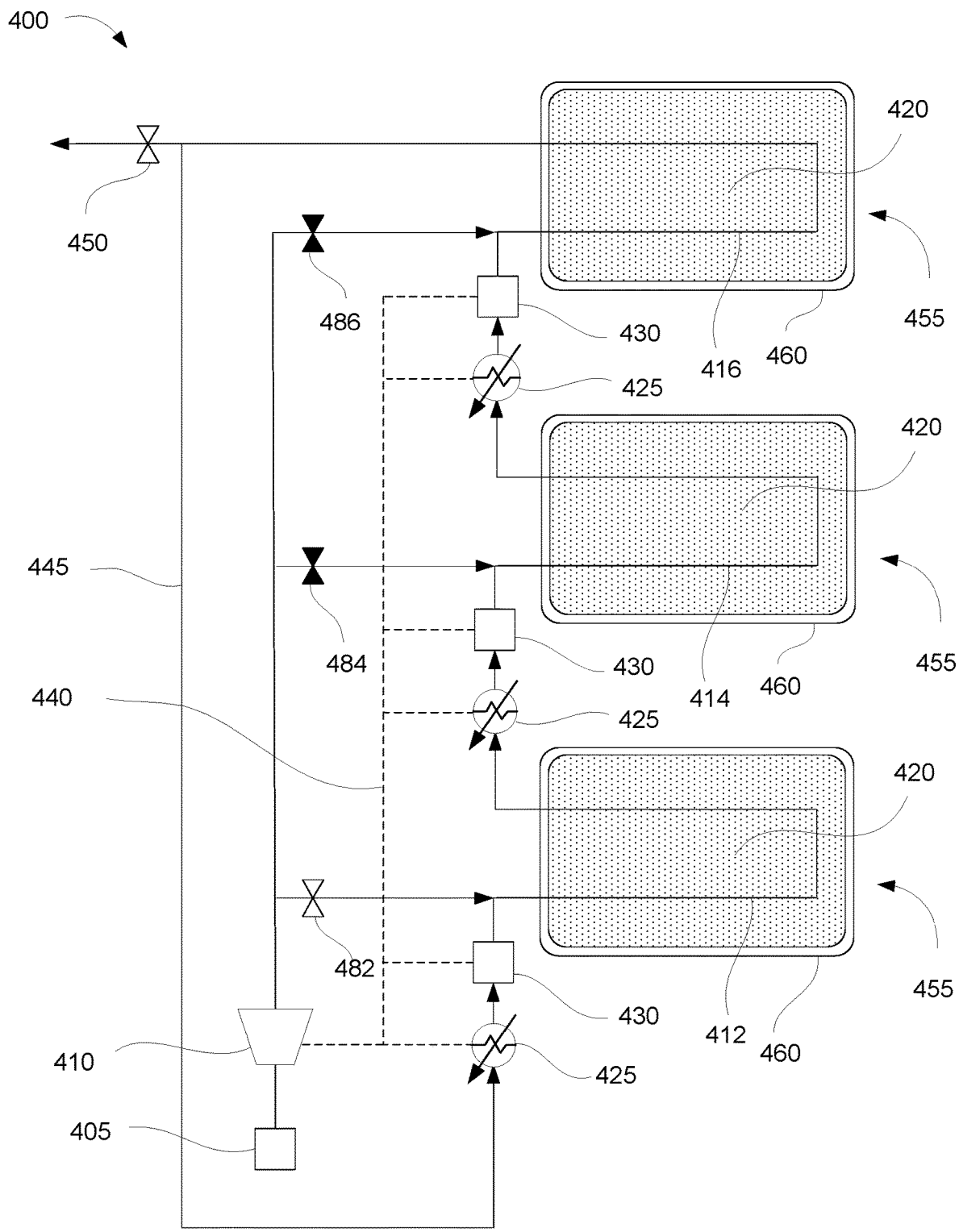
FIG. 4 is a schematic illustration of still another system for heating material through cogeneration of thermal and electrical energy, in accordance with an embodiment of the present invention.

FIG. 4 shows another example of a system 400 according to an embodiment of the present invention. In this example, the system includes a heat source 405 that produces hot exhaust gas and an electric generator 410 that produces electricity, as in the other examples described above. The hot exhaust gas from the heat source and electric generator can flow to three different heating conduits 412, 414, 416 through heating conduit valves 482, 484, and 486. In the figure, valve 482 is shown open while valves 484 and 486 are closed. In this configuration, hot exhaust gas flows into heating conduit 412, which heats a first of three bodies of crushed hydrocarbonaceous material 420. Each body of crushed hydrocarbonaceous material is within an impoundment 455 having an impermeable barrier layer 460. The hot exhaust gas then passes through an electric heater 425 and blower 430, through heating conduit 414, through another electric heater and blower, and then through heating conduit 416. Finally, the exhaust gas can be vented through vent valve 450 or recycled through recycle line 445. Each of the electric heaters and blowers is powered by the electric generator through electric line 440. The heating conduit valves can selectively be opened to allow hot exhaust gas from the heat source to pass to the heating conduits. Thus, any of the impoundments can be heated with hot exhaust gas directly from the heat source while the other impoundments can be heated by reheated exhaust gas that has passed through an electric heater.

Figure 5:
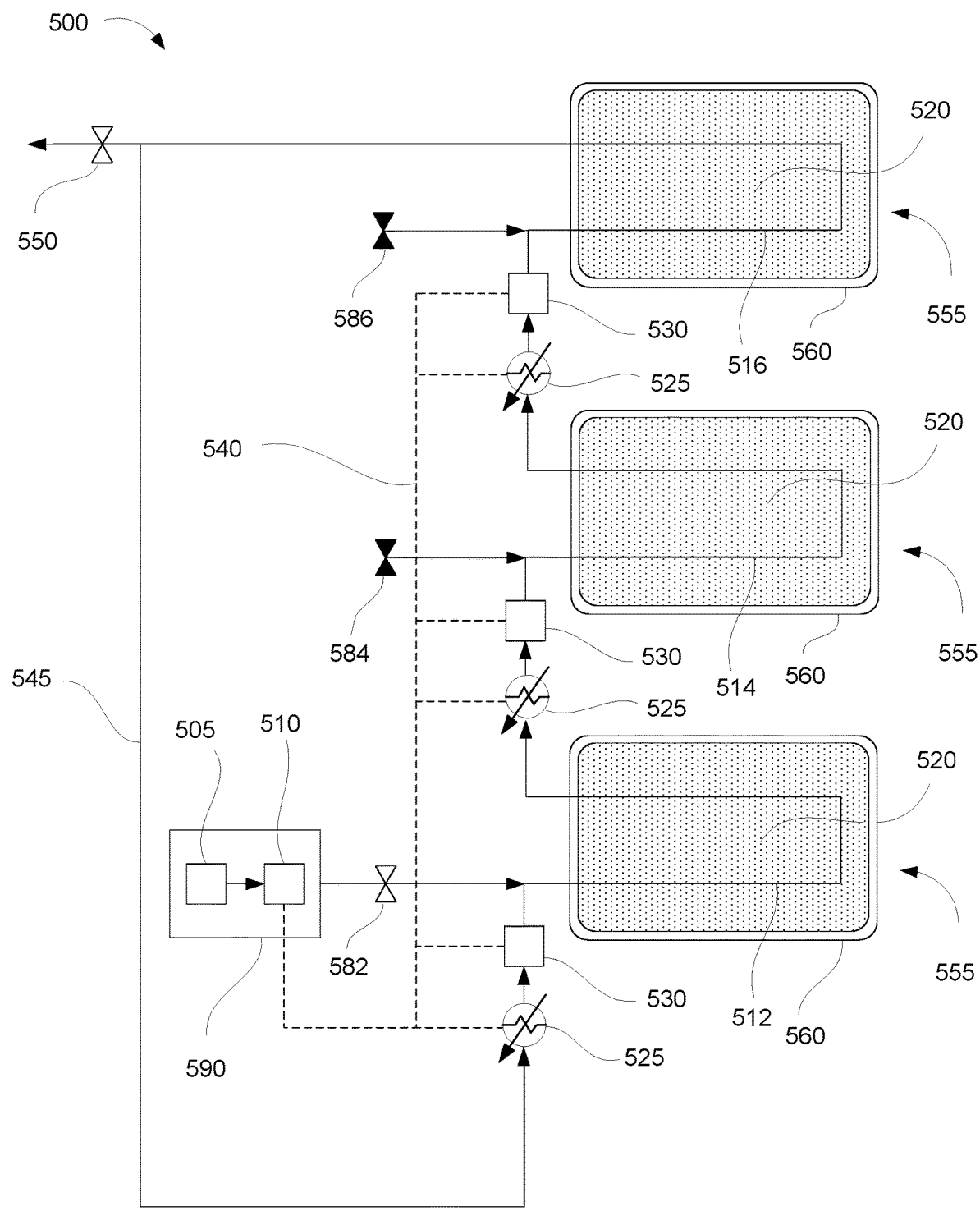
FIG. 5 is a schematic illustration of another system for heating material through cogeneration of thermal and electrical energy, in accordance with an embodiment of the present invention.

FIG. 5 shows yet another example of a system 500 in accordance with the present invention. In this embodiment, the heat source 505 and electric generator 510 are part of a mobile unit 590 that can move from one impoundment 555 to another. As shown in the figure, the mobile unit is located near a first impoundment. The mobile unit supplies hot exhaust gas to heating conduit 512 through heating conduit valve 582. The hot exhaust gas then flows through the heating conduit, heating the first body of crushed hydrocarbonaceous material 520. The exhaust gas is then reheated by a heater 525 and directed into heating conduit 514 by a blower 530. After flowing through this heating conduit, the exhaust gas is again reheated by an electric heater and directed by a blower into heating conduit 516. Each of the electric heaters and blowers are powered by the electric generator through electric line 540. As in the other embodiments described herein, each impoundment includes an impermeable barrier layer 560. After flowing through all three impoundments, the exhaust gas can be vented through venting valve 550 or recycled through recycle line 545. The mobile unit can be moved and the exhaust gas stream from the heat source can be connected to heating conduit valves 584 or 586 to direct hot exhaust gas direction from the heat source 505 into either of the other impoundments. The electric generator can remain connected to all of the electric heaters and blowers regardless of which position the mobile unit is in.

In certain examples, individual impoundments can be divided into zones that are heated sequentially. For example, an impoundment can be divided into several zones based on several height ranges within the impoundment. The lowest zone can be heated first, followed by the next zone from the bottom, until all of the zones have been heated sufficient to remove hydrocarbons therefrom. In such embodiments, the system can include additional valves and conduits for directing the hot exhaust gas to each individual zone within the impoundment.

Figure 6:
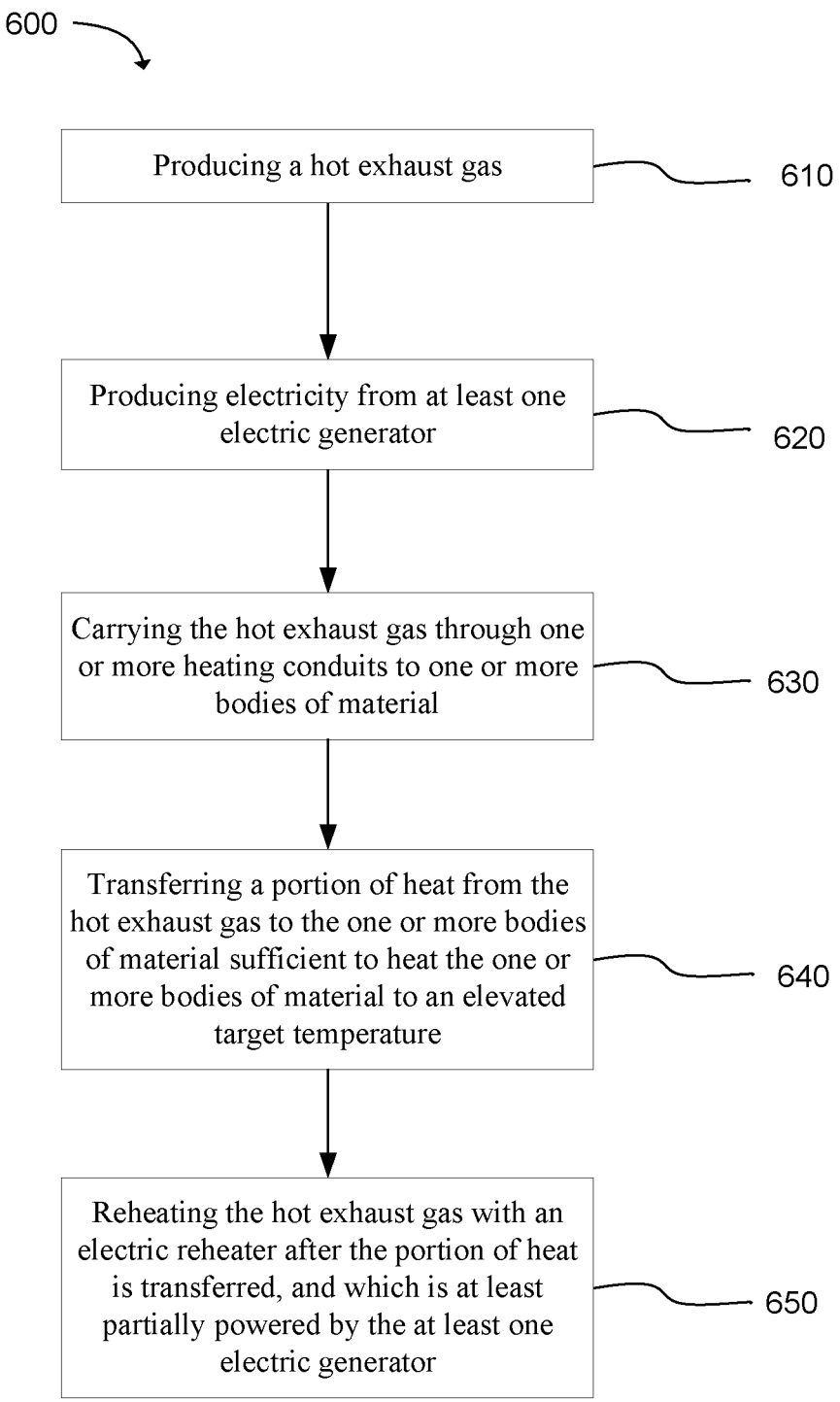
FIG. 6 is a flowchart illustrating a method of heating material through cogeneration of thermal and electrical energy, in accordance with an embodiment of the present invention.

The present invention also encompasses methods of heating material through cogeneration of thermal and electrical energy. FIG. 6 is a flowchart of a method 600 in accordance with the present invention. The method includes producing a hot exhaust gas from a heat source 610; producing electricity from an associated electric generator 620; carrying the hot exhaust gas through one or more heating conduits to one or more bodies of material 630; transferring a portion of heat from the hot exhaust gas to the one or more bodies of material sufficient to heat the one or more bodies of material to an elevated target temperature 640; and reheating the hot exhaust gas with an electric heater after the portion of heat is transferred, wherein the electric heater is at least partially powered by the at least one electric generator 650.

Methods according to the present invention can include any of the systems and features described above. Similarly, systems encompassed by the present invention can include any of the features described herein with respect to method steps. In a particular embodiment of a method according to the present invention, the one or more bodies of material described above can include a plurality of adjacent regions and the hot exhaust gas can be carried through a plurality of heating conduits connecting the plurality of adjacent regions. In one specific example, the plurality of adjacent regions can be adjacent regions within a single body of material. In another specific example, the adjacent regions can be adjacent bodies of material encapsulated within thermally insulating barriers. In some cases, the bodies of material can include crushed hydrocarbonaceous material and the thermally insulating barrier can be at least partially formed of earthen material. Earthen materials suitable for forming the barrier can include swelling clay, among any of the earthen materials described herein as a part of the layers making up impoundment walls.

In further examples of methods according to the present invention, the hot exhaust gas can be carried from a single heat source to each of the plurality of adjacent regions in series. Further, the hot exhaust gas can be reheated as the hot exhaust gas is carried between the adjacent regions. The hot exhaust gas can be reheated to a temperature from about 400° C. to about 550° C. By reheating the hot exhaust gas, the hot exhaust gas can be maintained at a temperature in the range of about 350° C. to about 550° C. at all points within the bodies of material. The hot exhaust gas can be heated by electric heaters spaced along the heating conduits. The spacing distance between the electric heaters can be from about 100 m to about 500 m. In some examples, electric heaters can be located within the bodies of material.

In additional examples of methods according to the present invention, the electric generator used to generate electricity can be coupled to a gas turbine which converts energy from the hot exhaust gas to mechanical motion such that the mechanical motion can be transferred to the electric generator to produce electricity. In a more specific example, the gas turbine can be an industrialized aircraft engine.

In other examples, the one or more bodies of material can include hydrocarbonaceous materials, such as oil shale, tar sands, coal, lignite, bitumen, peat, and combinations thereof.

In some examples, heat from the hot exhaust gas can be transferred to the bodies of material by direct heating, e.g., by injecting a portion of the hot exhaust gas into the bodies of material through perforations in the heating conduits. In other examples, heat can be transferred by thermal conduction through walls of the heating conduits.

In still further examples, methods can include recycling the hot exhaust gas after reheating, and carrying the hot exhaust gas through the heating conduits a second time.

The methods and systems described herein can be useful during system start-up, when the temperatures in the bodies of material being heated have not yet reached steady state. In embodiments involved production of hydrocarbons from large impoundments of crushed hydrocarbonaceous material, a significant amount of heating time can pass before the bodies of crushed hydrocarbonaceous material reach steady state temperatures. In one example, a method according to the present invention can include a start-up phase. The start-up phase can involve carrying the hot exhaust gas directly from a heat source to a first body of material through a heating conduit until the hot exhaust gas exiting the body of material reaches a steady state exit temperature from about 350° C. to about 450° C. The hot exhaust gas can enter the first body of material at a temperature from about 400° C. to about 550° C. Once the hot exhaust gas exiting the first body reaches the steady state temperature, the hot exhaust gas from the heat source can be redirected to a second body of material. The second body of material can then be heated up to a steady state temperature in the same way as the first. While the second body of material is being heated, the hot exhaust gas exiting from the second body of material can be reheated using the electric heater and then the reheated exhaust can be carried back through the first body of material. The reheated exhaust gas can be used to maintain the steady state temperature of the first body of material while the exhaust gas produced directly from the heat source is used to heat the second body of material up to the steady state temperature. This method can be extended to a third, fourth, and any number of additional bodies of material.

In more specific examples, the hot exhaust gas can be redirected from one body of material to the next by opening and closing valves in a conduit system as shown in FIG. 4. In alternative examples, the hot exhaust gas can be redirected from one body of material to the next by moving the heat source (and optionally the electric generator) to a new location near the next body of material, as shown in FIG. 5. In some cases, using a mobile burner or generator unit in this way can save the cost of constructing conduits connecting the bodies of material together. One mobile unit can potentially be used to start up a large number of impoundments by heating the bodies of material in the impoundments to the steady state temperature, and then the steady state temperature can be maintained by the electric heaters thereafter.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A system for heating material through cogeneration of thermal and electrical energy, comprising:
   one or more bodies of material comprising crushed hydrocarbonaceous material contained within one or more impoundments;
   a heat source and an electric generator oriented outside of the one or more bodies of material, where the heat source is configured to produce a hot exhaust gas and the electric generator produces electricity;
   one or more heating conduits associated with the heat source, wherein the heating conduits are configured to carry the hot exhaust gas from the heat source to the one or more bodies of material; and
   one or more electric heaters associated with the one or more heating conduits configured to reheat the hot exhaust gas after a portion of heat has been transferred from the hot exhaust gas to the one or more bodies of material, wherein the one or more electric heaters are at least partially powered by the electric generator.

2. The system of claim 1, wherein the one or more bodies of material comprise a plurality of adjacent regions and the one or more heating conduits comprise a plurality of heating conduits connecting the plurality of adjacent regions.

3. The system of claim 2, wherein the adjacent regions are adjacent regions within a single body of material.

4. The system of claim 2, wherein the adjacent regions are adjacent bodies of material encapsulated within thermally insulating barriers.

5. The system of claim 4, wherein the adjacent bodies of material comprise the thermally insulating barriers comprise earthen material.

6. The system of claim 5, wherein the earthen material comprises a swelling clay.

7. The system of claim 2, wherein the regions are adjacent bodies of material encapsulated within respective vertical vessels.

8. The system of claim 2, wherein the plurality of heating conduits are configured to carry the hot exhaust gas from the heat source to each of the adjacent regions in series.

9. The system of claim 2, wherein the one or more electric heaters are configured to reheat the exhaust gas as the exhaust gas is carried between the adjacent regions.

10. The system of claim 1, wherein the one or more electric heaters include at least two heaters which are spaced along the one or more heating conduits at a spacing distance from about 100 m to about 500 m.

11. The system of claim 1, wherein the heat source comprises a gas turbine mechanically coupled to the electric generator.

12. The system of claim 11, wherein the gas turbine is an industrialized aircraft engine.

13. The system of claim 1, wherein the heat source comprises a fuel cell, a combined cycle gas turbine, a diesel generator, or a boiler.

14. The system of claim 1, wherein the one or more bodies of material comprise a hydrocarbonaceous material selected from the group consisting of oil shale, tar sands, coal, lignite, bitumen, peat, and combinations thereof.

15. The system of claim 1, wherein a total number of bodies of material is greater than a total number of heat sources in the system.

16. The system of claim 1, wherein the one or more heating conduits comprise a perforated conduit configured to inject a portion of the hot exhaust gas directly into the one or more bodies of material.

17. The system of claim 1, wherein the one or more heating conduits comprise a solid walled conduit configured to heat the one or more bodies of material by thermal conduction.

18. The system of claim 1, wherein the one or more electric heaters are configured to reheat the hot exhaust gas to a temperature from about 400° C. to about 550° C.

19. The system of claim 1, wherein the one or more impoundments are each a vertical vessel.

20. A method of heating material through cogeneration of thermal and electrical energy, comprising:
producing a hot exhaust gas from at least one heat source;
producing electricity from at least one generator;
carrying the hot exhaust gas through one or more heating conduits to one or more bodies of material, wherein the one or more bodies of material comprise crushed hydrocarbonaceous material and the at least one heat source is oriented outside of the one or more bodies of material;
transferring a portion of heat from the hot exhaust gas to the one or more bodies of material sufficient to heat the one or more bodies of material to an elevated target temperature; and
reheating the hot exhaust gas with an electric heater after the portion of heat is transferred, wherein the electric heater is at least partially powered by the electricity produced from the at least one generator.

21. The method of claim 20, wherein the one or more bodies of material comprise a plurality of adjacent regions and the hot exhaust gas is carried through a plurality of heating conduits connecting the plurality of adjacent regions.

22. The method of claim 21, wherein the adjacent regions are adjacent regions within a single body of material or the adjacent regions are adjacent bodies of material encapsulated within respective thermally insulating barriers.

23. The method of claim 21, wherein the adjacent regions are adjacent bodies of material encapsulated within respective vertical vessels.

24. The method of claim 21, wherein carrying the hot exhaust gas comprises carrying the hot exhaust from a single heat source to the each of the adjacent regions in series.

25. The method of claim 21, wherein the hot exhaust gas is reheated as the hot exhaust gas is carried between the adjacent regions.

26. The method of claim 20, wherein the one or more bodies of material comprise a hydrocarbonaceous material selected from the group consisting of oil shale, tar sands, coal, lignite, bitumen, peat, and combinations thereof.

27. The method of claim 20, further comprising:
recycling the hot exhaust gas after the reheating; and
carrying the hot exhaust gas through the one or more heating conduits a second time.

28. The method of claim 20, further comprising, in a start-up phase:
carrying the hot exhaust gas directly from a first heat source to a first body of material through a heating conduit until the hot exhaust gas exiting the first body of material reaches a steady state exit temperature from about 350° C. to about 450° C., wherein the hot exhaust gas enters the first body of material at a temperature from about 400° C. to about 550° C.;
after the hot exhaust gas exiting the first body of material reaches the steady state exit temperature, redirecting the hot exhaust gas from the first heat source to a second body of material;
reheating the hot exhaust gas exiting the second body of material using the electric heater; and
carrying the reheated hot exhaust gas back through the first body of material.

29. The method of claim 20, wherein the hot exhaust gas is reheated to a temperature from about 400° C. to about 550° C.

30. The method of claim 20, further comprising maintaining the hot exhaust gas within a steady state temperature range from about 350° C. to about 550° C.

31. The method of claim 20, wherein the hot exhaust gas is reheated by additional electric heaters spaced along the one or more heating conduits at a spacing distance from about 100 m to about 500 m.

32. The method of claim 20, wherein the at least one heat source comprises a gas turbine mechanically coupled to the at least one generator or comprises a fuel cell.

33. The method of claim 32, wherein the gas turbine is an industrialized aircraft engine.

34. The method of claim 20, wherein the hot exhaust gas is produced at a heat source temperature from 800° F. to 900° F.

\* \* \* \* \*